US007783607B2

(12) United States Patent
Cooper et al.

(10) Patent No.: US 7,783,607 B2
(45) Date of Patent: Aug. 24, 2010

(54) DECENTRALIZED RECORD EXPIRY

(75) Inventors: Brian Cooper, San Jose, CA (US); Daniel Weaver, Redwood City, CA (US); Michael Bigby, San Jose, CA (US); Utkarsh Srivastava, Fremont, CA (US); Philip L. Bohannon, Cupertino, CA (US); Ramana Yerneni, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 413 days.

(21) Appl. No.: 11/863,902

(22) Filed: Sep. 28, 2007

(65) Prior Publication Data

US 2009/0089313 A1 Apr. 2, 2009

(51) Int. Cl.
*G06F 17/30* (2006.01)
(52) U.S. Cl. ..................... 707/662; 711/161; 711/162
(58) Field of Classification Search ............... 707/662; 711/161–162
See application file for complete search history.

(56) References Cited

U.S. PATENT DOCUMENTS

| 7,290,203 B2 * | 10/2007 | Emma et al. ............ 714/809 |
| 2004/0054854 A1 * | 3/2004 | Thiyagaranjan et al. ..... 711/141 |
| 2005/0125411 A1 * | 6/2005 | Kilian et al. ................ 707/10 |
| 2006/0107090 A1 * | 5/2006 | Emma et al. ................... 714/5 |
| 2006/0282669 A1 * | 12/2006 | Legg ......................... 713/171 |

* cited by examiner

*Primary Examiner*—Cam Y Truong
*Assistant Examiner*—Noosha Arjomandi
(74) *Attorney, Agent, or Firm*—Fiala & Weaver, P.L.L.C.

(57) ABSTRACT

A technique is described that reduces the complexity and resource consumption associated with performing record expiry in a distributed database system. In accordance with the technique, a record is checked to see if it has expired only when it has been accessed for a read or a write. If at the time of a read a record is determined to have expired, then it is not served. If at the time of a write a record is determined to have expired, then the write is treated as an insertion of a new record, and steps are taken to treat the insertion consistently with regard to the previous expired version. A background process is used to delete records that have not been written to or actively deleted by a client after expiration.

12 Claims, 12 Drawing Sheets

DECENTRALIZED RECORD EXPIRY

BACKGROUND OF THE INVENTION

1. Field of the Invention

The invention generally relates to the deletion of data from a database. In particular, the invention relates to the automatic deletion of expired data in a distributed database system.

2. Background

As used herein the term "record expiry" refers to a system-initiated deletion of a database record. Database records may be set to expire for any number of reasons. For example, the value or relevance of some information decreases over time. Additionally, expiry may be used to remove older data from a system to free up resources to make room for newer data.

Various approaches are known for automatically determining when a record in a database has expired and then deleting the record accordingly. By necessity, every approach adds some level of complexity to a database system and consumes some resources of the system. In a distributed database system in which multiple copies of the same record exist in different storage locations, record expiry becomes an even more complex task as the expiration of a record must be carried out in a manner that ensures that different versions of the same record can be properly sequenced after the expiration has occurred. Furthermore, the expiration of a record in a distributed database system consumes even more resources as database operations impacting one copy of a record must be propagated to remotely-stored copies of the same record.

What is needed then is a technique that reduces the complexity and resource consumption associated with performing record expiry in a distributed database system.

BRIEF SUMMARY OF THE INVENTION

The present invention provides a technique that reduces the complexity and resource consumption associated with performing record expiry in a distributed database system.

In particular, a method is described herein for automatically deleting an expired record in a distributed database system that includes a plurality of nodes, wherein each node is configured to manage a respective one of a plurality of databases. In accordance with the method, a write request is received for a record at one of the plurality of nodes. The record is part of a partition stored in the database managed by the one of the plurality of nodes. Responsive to receiving the write request, it is determined whether the record is expired. Responsive to a determination that the record is expired, it is determined if an incarnation number associated with the partition exceeds an incarnation number stored in the record. Responsive to a determination that the incarnation number associated with the partition exceeds the incarnation number stored in the record, an updated record is generated based on the write request, wherein generating the updated record comprises replacing the incarnation number stored in the record with the incarnation number associated with the partition. Further responsive to determining that the incarnation number associated with the partition exceeds the incarnation number stored in the record, the expired record is overwritten with the updated record.

A distributed database system is also described herein. The system includes a plurality of nodes, wherein the nodes are interconnected via a communication system. The system also includes a plurality of databases, wherein each node in the plurality of nodes is configured to manage a respective one of a plurality of databases. Each node in the plurality of nodes is further configured to receive a write request for a record, wherein the record is part of a partition stored in the database managed by the node, to determine whether the record is expired responsive to receiving the write request, to determine if an incarnation number associated with the partition exceeds an incarnation number stored in the record responsive to determining that the record is expired, and, responsive to determining that the incarnation number associated with the partition exceeds the incarnation number stored in the record, to generate an updated record based on the write request, wherein generating the updated record comprises replacing the incarnation number stored in the record with the incarnation number associated with the partition, and to overwrite the expired record with the updated record.

An additional method is described herein for automatically deleting an expired record in a distributed database system comprising a plurality of nodes, wherein each node is configured to manage a respective one of a plurality of databases. In accordance with the method, a record is read at one of the plurality of nodes. The record is part of a partition stored in the database managed by the one of the plurality of nodes. It is then determined whether the record is expired. Responsive to a determination that the record is expired, it is determined if an incarnation number associated with the partition exceeds an incarnation number stored in the record. Responsive to determining that the incarnation number associated with the partition exceeds the incarnation number stored in the record, the record is purged.

An additional distributed database system is also described herein. The system includes a plurality of nodes, wherein the nodes are interconnected via a communication system. The system also includes a plurality of databases, wherein each node in the plurality of nodes is configured to manage a respective one of a plurality of databases. Each node in the plurality of nodes is further configured to read a record, wherein the record is part of a partition stored in the database managed by the node, to determine whether the record is expired, to determine if an incarnation number associated with the partition exceeds an incarnation number stored in the record responsive to determining that the record is expired, and to purge the record responsive to determining that the incarnation number associated with the partition exceeds the incarnation number stored in the record.

Another method is described herein for determining in a distributed database system which of a first version of a record and a second version of a record is the most recent. In accordance with the method, an incarnation number associated with the first version of the record is compared to an incarnation number associated with the second version of the record. Each incarnation number represents a version of a partition that existed at the time each record was created. Responsive to determining that one of the first version of the record or the second version of the record has a greater incarnation number, the one of the first version of the record or the second version of the record having the greater incarnation number is identified as the most recent.

The foregoing method may further include comparing a sequence number associated with the first version of the record and a sequence number associated with the second version of the record responsive to determining that the first version of the record and the second version of the record have the same incarnation number. Then, responsive to determining that one of the first version of the record or the second version of the record has a greater sequence number, the one of the first version of the record or the second version of the record having the greater sequence number is identified as the most recent.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
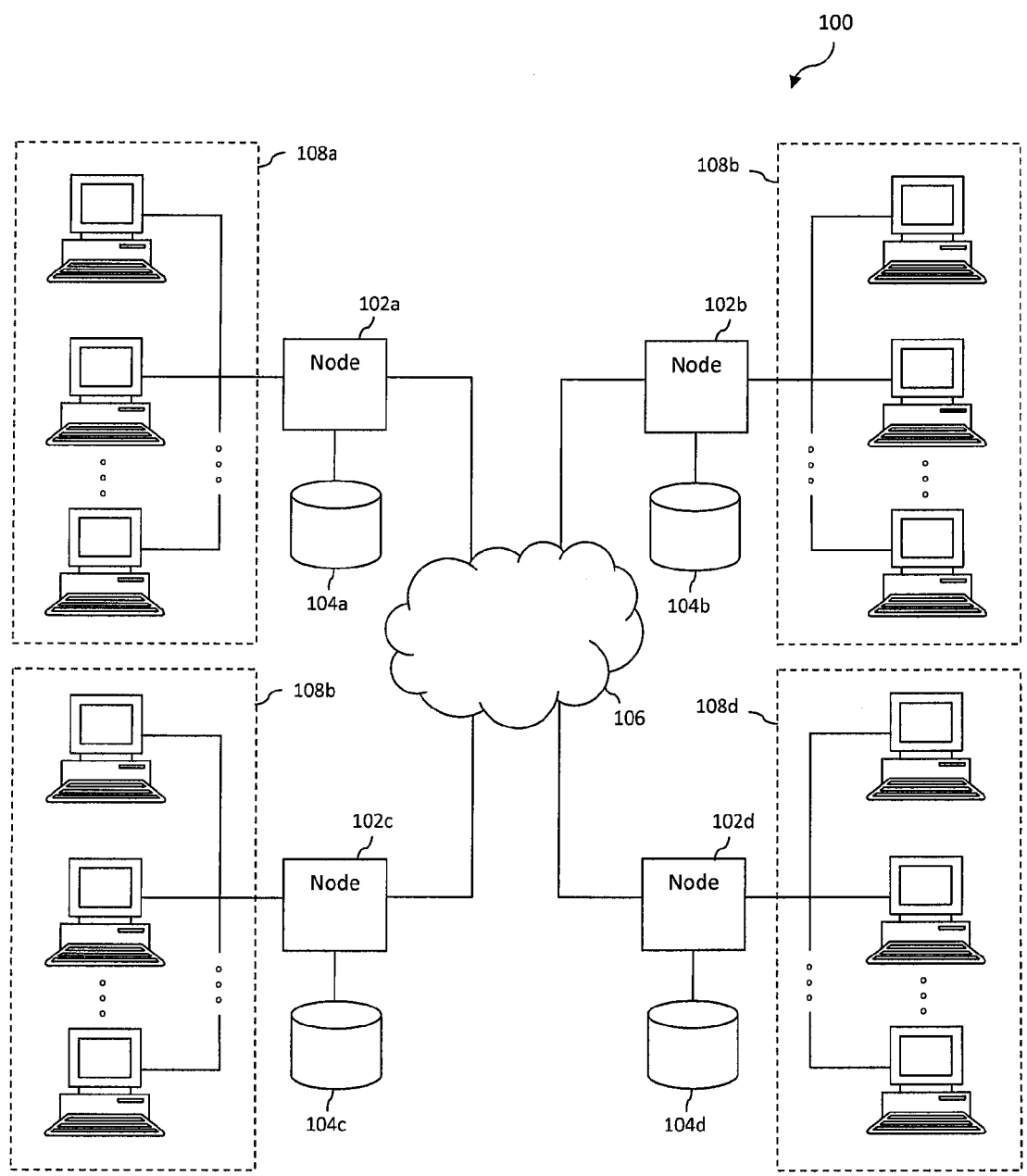
FIG. 1 is a block diagram of an example distributed database system in which an embodiment of the present invention may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

FIG. 1 is a high-level block diagram of an example distributed database system 100 in which an embodiment of the present invention may operate. System 100 is described herein by way of example only and is not intended to limit the present invention. Based on the teachings provided herein, persons skilled in the relevant art(s) will understand that the present invention may be implemented in a distributed database system having a different architecture than that of system 100 or in a distributed database system that is configured to function in a different manner than that of system 100.

As shown in FIG. 1, distributed database system 100 includes a plurality of nodes 102a, 102b, 102c and 102d. Although only four nodes are shown in FIG. 1, persons skilled in the relevant art(s) will appreciate that, depending on the size and organization of distributed database system 100, the system may include any number of nodes. Nodes 102a, 102b, 102c and 102d are communicatively interconnected via a communication system 106.

In the following description, two components of system 100 will be termed "local" with respect to one another if communication between them does not require a transfer of information between any of nodes 102a, 102b, 102c and 102d. Otherwise, the two components will be termed "remote." In one implementation of distributed database system 100, the nodes are geographically dispersed. However, this need not be the case. Thus, as used herein, the terms "local" and "remote" are not intended to suggest that the nodes must be geographically dispersed.

Each node is configured to provide database services to a different plurality of local clients. Thus, for example, node 102a is configured to provide database services to a plurality of local clients 108a, node 102b is configured to provide database services to a plurality of local clients 108b, node 102c is configured to provide database services to a plurality of local clients 108c, and node 102d is configured to provide database services to a plurality of local clients 108d.

To provide database services, each node is communicatively connected to a local database. In particular, node 102a is connected to a local database 104a, node 102b is connected to a local database 104b, node 102c is connected to a local database 104c, and node 102d is connected to a local database 104d. Each local database includes a copy of all or a portion of the total database records within distributed database system 100. Thus, copies of the data records of system 100 are distributed across the multiple databases 102a, 102b, 102c and 102d.

In distributed database system 100, the database records are divided into partitions and replicas of the partitions are stored in each local database 104a, 104b, 104c and 104d. Although the techniques of partitioning and replicating are well-known to persons skilled in the relevant art(s), a brief description of these techniques as applied to the records of distributed database system 100 will now be provided.

As noted above, in distributed database system 100, the database records are divided into partitions. Each partition comprises a distinct and independent portion of the database. Taken together, the partitions constitute a copy of the entire logical database. In distributed database system 100, the manner in which the database records are divided is termed "horizontal partitioning." In horizontal partitioning, individual rows of a database are placed into different tables, wherein each row represents a database record. This is in contrast to "vertical partitioning," which involves removing columns (or fields) to obtain tables having fewer columns, and then creating new tables to store the remaining columns.

Figure 2:
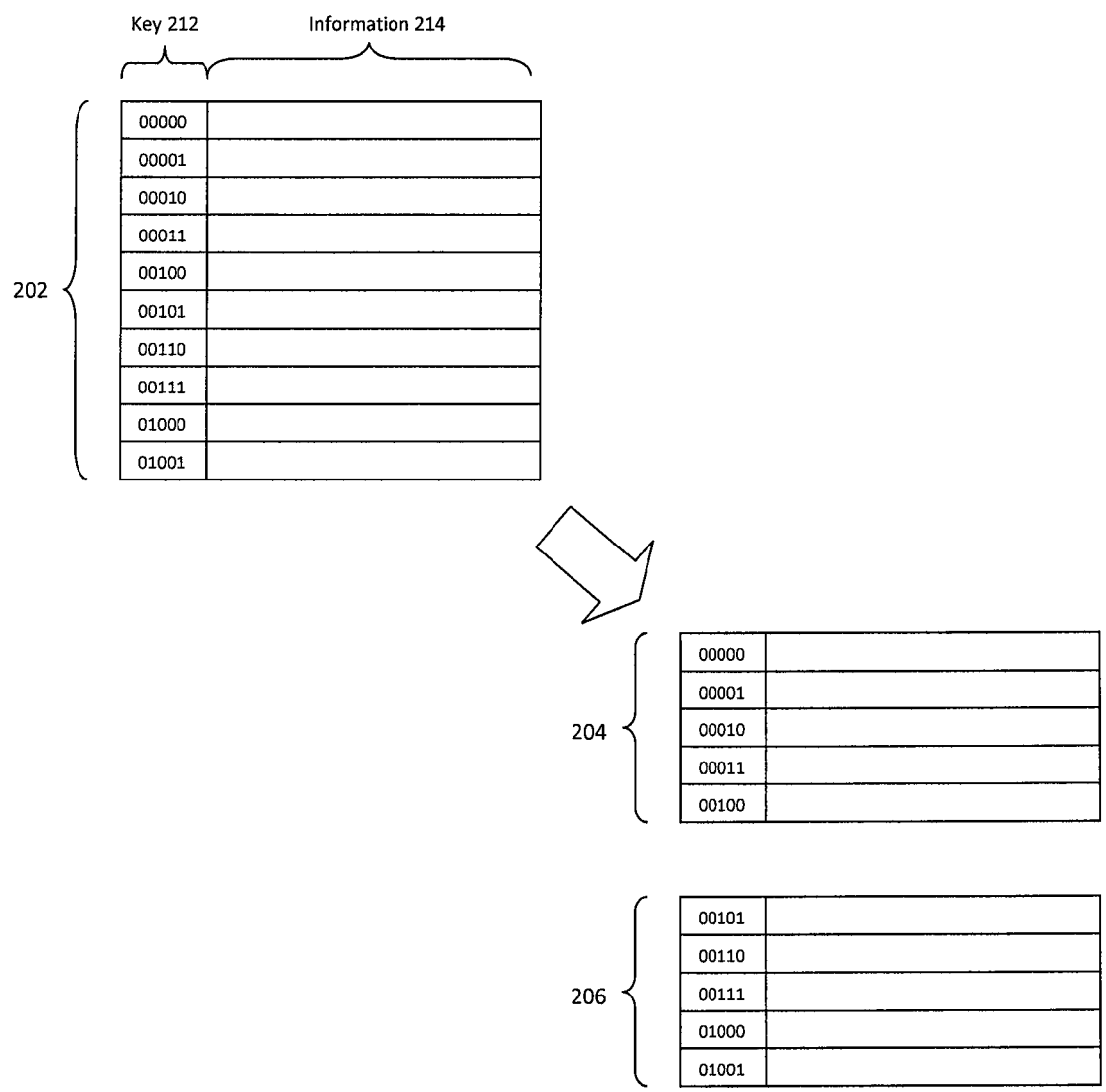
FIG. 2 depicts a simple example of horizontal partitioning.

A simple example of horizontal partitioning is illustrated in FIG. 2. As shown in FIG. 2, a database 202 includes a plurality of records, wherein each record comprises a unique key 212 and associated information 214. Key 212 is used to uniquely identify each record and serves as an index for locating each record within database 202. Information 214 represents any type of information that may be stored in a database in association with a key and may comprise, for example, one or more information fields.

Through the application of horizontal partitioning, database 202 is split into a first partition 204 and a second partition 206, wherein first partition 204 includes the first five records of database 202 and second partition 206 includes the last five records. Taken together, first partition 204 and second partition 206 comprise a complete logical copy of database 202. Of course, this is just one example of horizontal partitioning. Persons skilled in the relevant art(s) will understand that by using horizontal partitioning, a single database may be divided into any number of partitions, and that partitions may include any number of records.

Horizontal partitioning may be used for a variety of reasons. For example, a large database may be rendered more manageable by dividing it into separate partitions. Furthermore, in some systems, different partitions can be assigned to different storage systems or devices to parallelize and improve throughput of network operations. Additionally, partitioning may facilitate load balancing by allowing one or more partitions to be moved from one storage system or device to another.

As also noted above, in addition to using partitions, distributed database system 100 also uses replication. In replication, multiple copies or instances of a database or its partitions are created, and the multiple copies are managed by different nodes. Replication can also improve the throughput of network operations. For example, one benefit of replication is that it permits clients at disparate geographic locations to each access a local replica of the same data, thereby increasing the speed and decreasing the expense associated with database accesses by each client. Replication can also be used for load balancing purposes.

Figure 3:
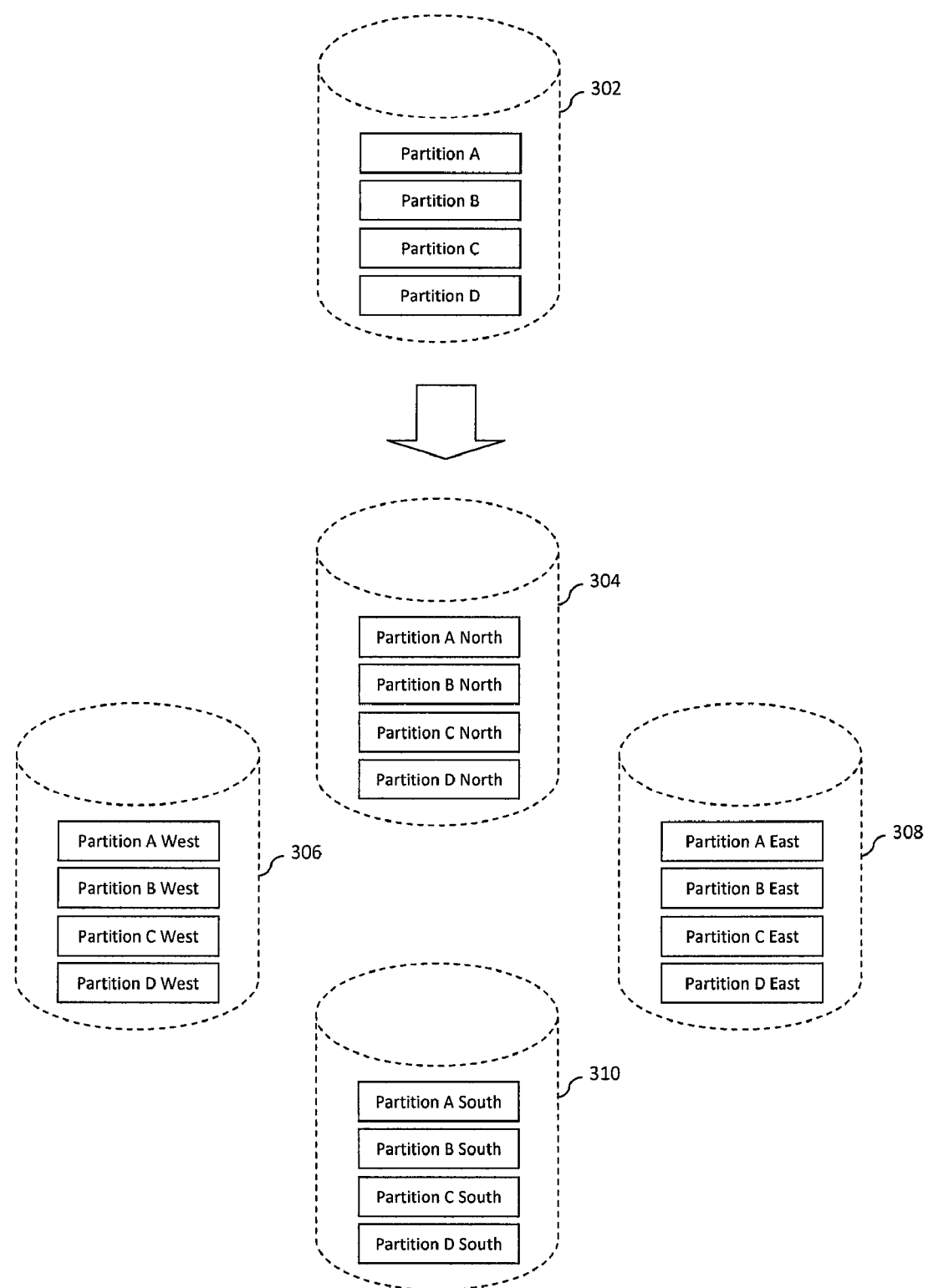
FIG. 3 depicts a simple example of replication.

A simple example of replication is illustrated in FIG. 3. As shown in FIG. 3, a single logical database 302 comprises four horizontal partitions—namely, Partition A, Partition B, Partition C and Partition D. Using replication, the single logical database 302 is copied to generate four logical databases replicas—namely, logical database 304, logical database 306, logical database 308 and logical database 310. Each of the logical database replicas includes a copy of the same partitions included in the original logical database 302. In this example, each of the logical database replicas is used to serve clients in a different geographic region and each replica's partitions are named accordingly. For example, logical database 304 serves clients in a geographic region denoted "north" and its partitions are accordingly named Partition A North, Partition B North, Partition C North and Partition D North. This is just one example of replication. Persons skilled in the relevant art(s) will understand that by using replication, any number of partition replicas may be created.

Figure 4:
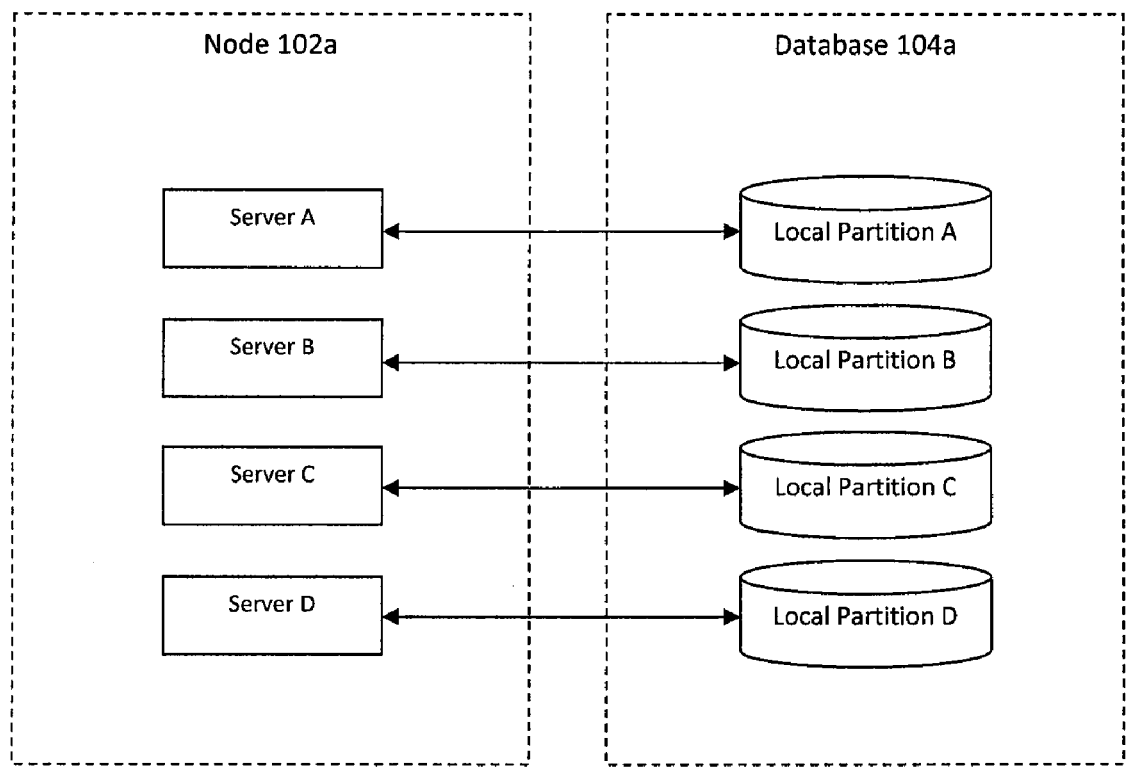
FIG. 4 illustrates one implementation of a distributed database system in which a node comprises a plurality of servers and in which each server is connected to a corresponding local storage system or device that stores a different partition replica.

In one implementation of distributed database system 100, each node comprises a plurality of servers, and each of the servers is responsible for managing a different partition replica that is stored on a respective local storage system or device. This is depicted in FIG. 4, which illustrates an implementation of system 100 in which node 102*a* comprises four servers—namely, server A, server B, server C and server D. Each of these servers is connected to a corresponding local storage system or device which stores a particular partition replica. In particular, as shown in FIG. 4, server A is connected to a local storage system or device that stores local partition A, server B is connected to a local storage system or device that stores local partition B, server C is connected to a local storage system or device that stores local partition C and server D is connected to a local storage system or device that stores local partition D. Taken together, local partitions A, B, C and D may comprise a complete replica or copy of the data records of system 100. Also, taken together, the storage systems or devices used to store these local partitions comprise local database 104*a*.

Because distributed database system 100 stores a separate replica of the same set of partitions in each of local databases 104*a*, 104*b*, 104*c* and 104*d*, the system is configured to use certain protocols to ensure that changes made to a database record in one partition replica are propagated to copies of the same record that exist in other replicas of the same partition. This is necessary to ensure consistency among the multiple partition replicas.

For example, because multiple copies of a single record can exist in different partition replicas, distributed database system 100 is configured to designate only one node a "record master" for each record. The record master always manages the most recent version of the record. Distributed database system 100 is configured to ensure that any update of a record is performed by the record master. The update is then propagated from the record master to all the other nodes using a message broker or other notification system or protocol.

Figure 5:
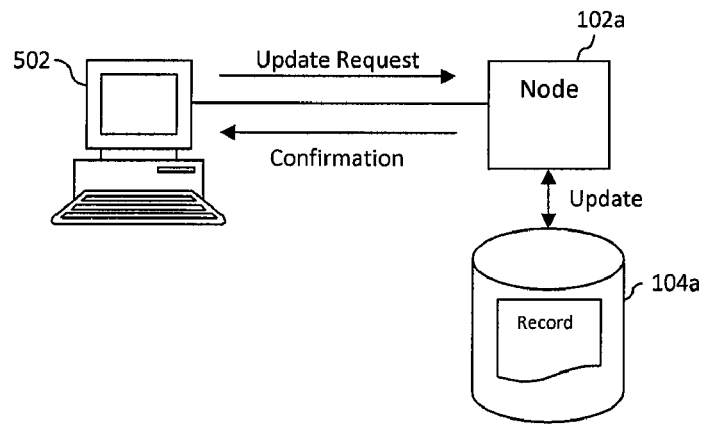
FIG. 5 shows components of a distributed database system that are involved in updating a record when a client update request is first received by a node that is designated the record master.

By way of illustration, FIG. 5 depicts components of distributed database system 100 that are involved in updating a record when the client update request is first received by the record master. As shown in FIG. 5, a client 502 (which is intended to represent one of the plurality of clients 108*a* shown in FIG. 1) requests an update by sending a request to node 102*a*. Because node 102*a* is the record master, it can immediately perform the update and then send a confirmation message back to client 502. The update can then be propagated from node 102*a* to the other nodes shown in FIG. 1 for application to other copies of the same record residing in remote databases. This propagation can occur sometime after the initial update has occurred. Consequently, the propagation of the update does not in any way impact the speed with which the initial update occurs. Also, the propagation can be scheduled to occur at a time that least interferes with the operation of distributed database system 100, such as at a time when communication system 106 has more bandwidth than it needs to satisfy pending client requests.

Alternatively, node 102*a* can initiate the propagation of the update to the other nodes shown in FIG. 1 prior to performing the update locally. This approach is beneficial in that it ensures that the update will be published to the other nodes even if node 102*a* should fail during the performance of the local update. Should node 102*a* fail, a process is implemented that ensures that node 102*a* will implement the pending update locally after node 102*a* is brought back online.

Figure 6:
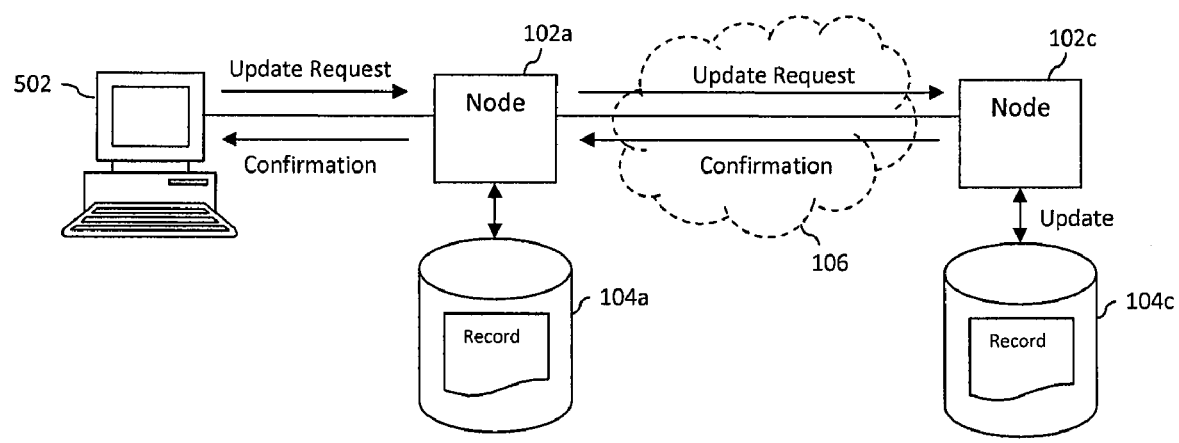
FIG. 6 shows components of a distributed database system that are involved in updating a record when a client update request is first received by a node that is not designated the record master.

In contrast to the example shown in FIG. 5, FIG. 6 illustrates components of distributed database system 100 that are involved in updating a record when the client update request is first received by a node that is not the record master. As shown in FIG. 6, client 502 requests an update by sending a request to node 102*a*. Because node 102*a* is not the record master, node 102*a* must forward the request via communication system 106 to the record master. In this example, the record master is node 104*c*. Thus, node 102*a* forwards the request to node 102*c*. Node 102*c* performs the update and then sends a confirmation message back to node 102*a* for forwarding on to client 402. The update is also propagated to the other nodes shown in FIG. 1 for application to other copies of the same record residing in remote databases.

Depending upon how distributed database system 100 is configured, in addition to forwarding the request to node 102*c* and forwarding the confirmation to client 502, node 102*a* may also need to perform a database operation to determine whether it is, in fact, the record master for the record to be updated. This is because in one implementation of distributed database system 100, whether a node is a record master for a particular record is designated by an indicator that is stored within the record itself. This is illustrated in example database record 700 of FIG. 7, which includes a record master indicator 706. After determining that it is not the record master, node 102*a* may also need to engage in communication with each of nodes 102*b*, 102*c* and 102*d* to determine which one of those nodes is the record master.

As can be seen from FIG. 5 and FIG. 6, then, performing an update when the record master first receives the update request consumes less time and system resources than when a node that is not the record master first receives the update request. Thus, distributed database system 100 is configured to designate a node as a record master for a record if the record in question is deemed most likely to be updated by clients that are local with respect to the node. The manner in which distributed database system 100 performs this designation is beyond the scope of this application and therefore will not be described further herein.

In distributed database system 100, insertions and deletions may be thought of as special kinds of updates. As will be described in more detail herein, in one mode of operation, an insertion request must be forwarded to a node that is designated the partition master and the partition master inserts the record if it is determined that no other record exists that has the same key. As will also be described in more detail herein, deletions are performed using a multi-step process. First the record master hides but does not delete the relevant record. Then, the deletion request is forwarded to a partition master. The partition master deletes the local copy of the relevant record and then publishes both the deletion and a new incarnation number to the remote nodes. Only then does the record master purge the relevant record.

In contrast to a client request to update a record, which must always be performed by the record master, requests to read a record need not always be performed by the record master. In other words, distributed database system 100 allows read requests to be satisfied by nodes that are not the record master by accessing a record stored in a local database, even if that record is not the most recent copy of that record. This allows distributed database system 100 to optionally present out-of-date data to a user in the interest of decreasing transaction time and conserving system resources.

B. Use of Version Numbers in Accordance with an Embodiment of the Present Invention In distributed database system 100, each insertion, deletion or update of a record may be thought of as producing a new "logical version" of the record. The term "logical" is used in this context because distributed database system 100 is not configured to actually maintain a copy of each version of the record, but rather is configured to maintain only the most recent version. The term "logical" is also used in this context because a deleted record may be considered to be another version of a record even though the record no longer exists after the deletion.

Certain operations performed by database management system 100 require the system to determine which version of a particular record is the most recent. For example, if a series of updates are performed on a record by the record master, a remote node may subsequently receive multiple versions of the record propagated from the record master. The versions may not necessarily be received in an order that corresponds to the order in which the updates were performed by the record master. For example, if communication system 106 is a packet network, network latency may cause one version of the record representing a more recent update to arrive before another version of the record representing an older update. To deal with this, the node receiving the multiple versions of the record must be capable of determining which version is truly the most recent.

In order to make this determination, distributed database system 100 maintains a version number in association with each database record. The version number is stored as a part of each record. In accordance with an embodiment of the present invention, the version number comprises two components: a record-level incarnation number, which is a copy of a partition-level incarnation number that is incremented whenever a record in a partition is deleted (and possibly more frequently), and a record-level sequence number, which is incremented whenever a record is updated. As will be described in more detail below, the composite nature of the version number allows distributed database system 100 to properly sequence different versions of a given record.

Figure 7:
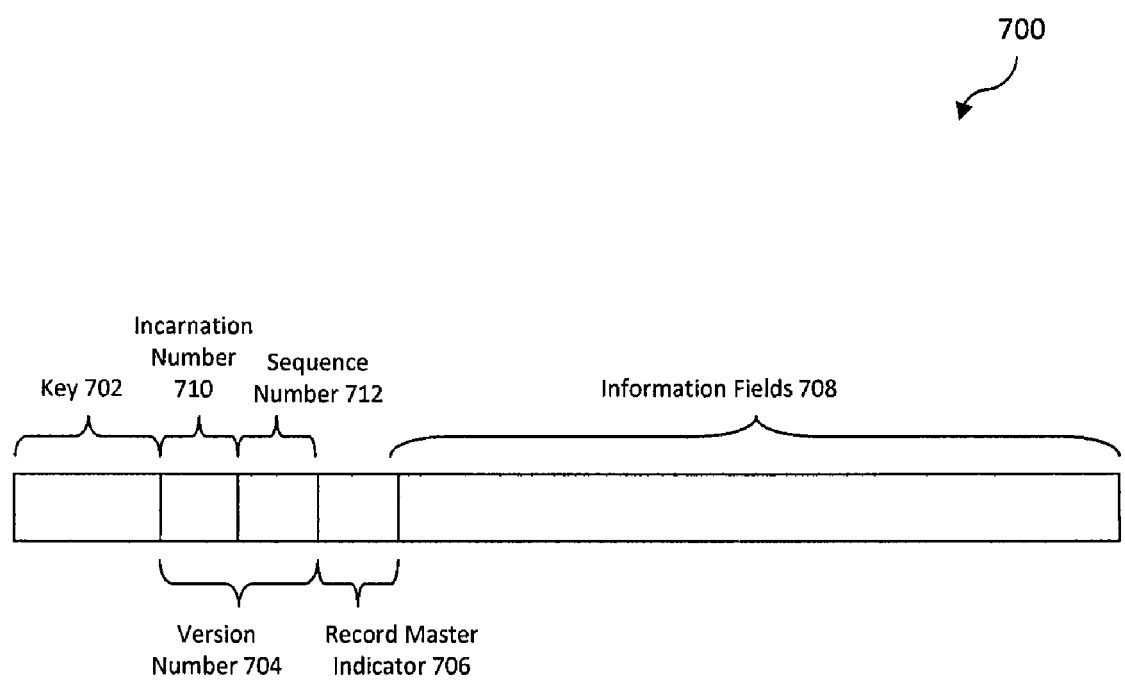
FIG. 7 depicts a format of an example database record that includes a composite version number in accordance with an embodiment of the present invention.

FIG. 7 depicts a format 700 of an example database record that includes a version number in accordance with an embodiment of the present invention. As shown in FIG. 7, in addition to a key 702, a record master indicator 706, and information fields 708, the database record also includes a version number 704, which consists of a record-level incarnation number 710 and a sequence number 712.

As noted above, in distributed database system 100, a partition-level incarnation number is maintained. This means that each node is configured to maintain an incarnation number for each locally-stored database partition. However, because distributed database system 100 stores multiple replicas of each partition, the system is also configured to designate only one of the nodes a "partition master." The partition master is the node that that stores the only authoritative copy of the current partition-level incarnation number for a given partition. All other nodes must obtain their partition-level incarnation number for that partition from the partition master. Furthermore, as will be described in more detail below, all deletions performed by a record master must be reported to the partition master and all insertions performed by a record master must be performed, in part, by obtaining a partition-level incarnation number from the partition master.

Figure 8:
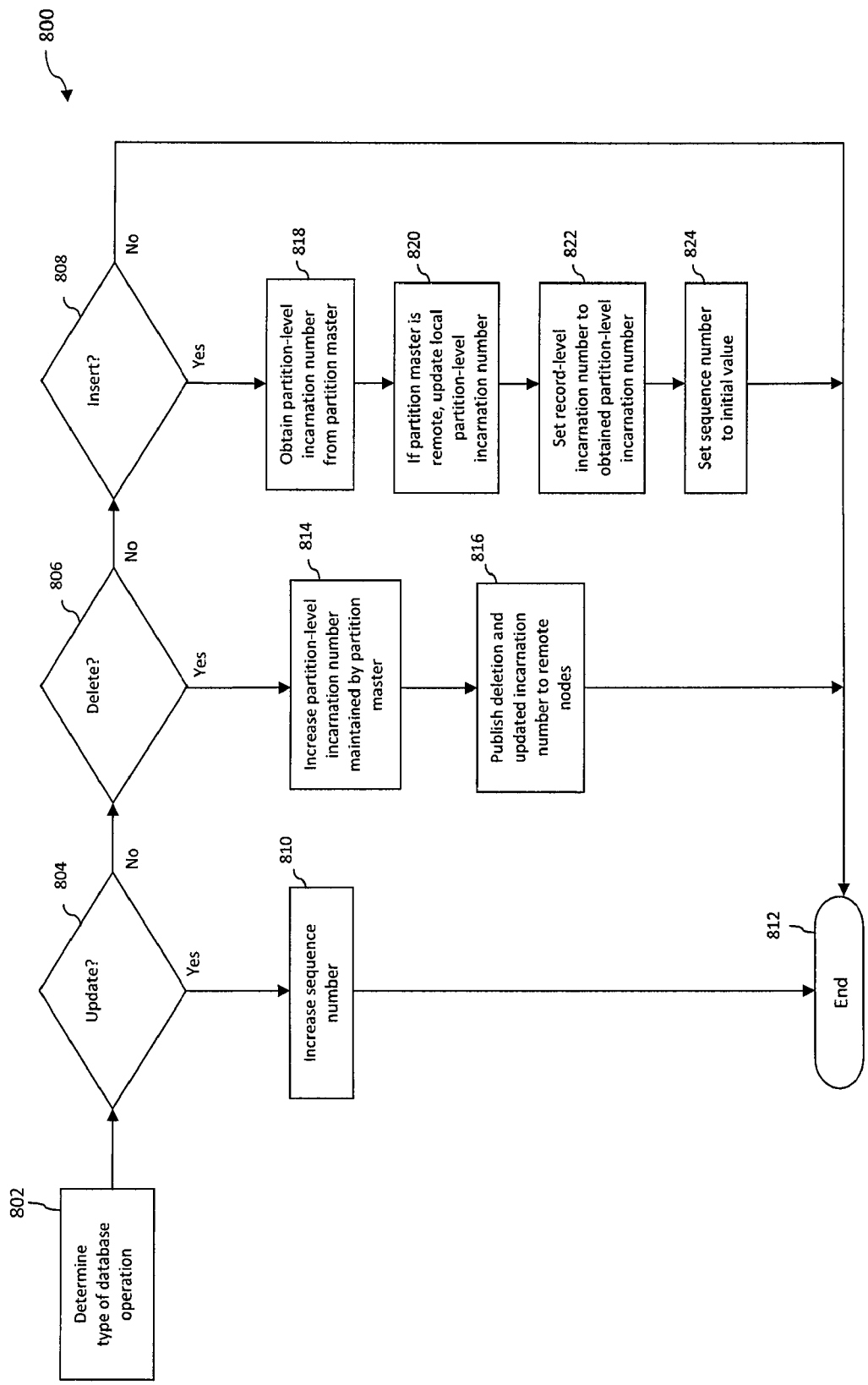
FIG. 8 illustrates a flowchart of a method for setting and/or updating incarnation and sequence numbers in accordance with an embodiment of the present invention.

FIG. 8 illustrates a flowchart 800 of a method for setting and/or updating incarnation and sequence numbers in accordance with an embodiment of the present invention. In particular, flowchart 800 depicts a method by which an embodiment of the present invention sets and/or updates partition-level incarnation numbers as well as record-level incarnation numbers and sequence numbers. In one embodiment, the method of flowchart 800 is performed by each node in distributed database system 100 whenever the node performs a database operation upon a record for which the node is the designated record master. Generally speaking, database operations that are performed by a node upon a record for which the node is not designated record master will not cause a modification of a partition-level incarnation number, a record-level incarnation number, or a sequence number.

As shown in FIG. 8, the method of flowchart 800 begins at step 802, in which the type of database operation that has been performed by the record master is determined. As shown at decision step 804, if the database operation is an update, then the sequence number associated with the record is increased as shown at step 810. This increased sequence number will then be reflected in all updates propagated from the record master to other nodes for updating remotely-stored copies of the same record. After step 810, processing ends as shown at step 812.

If the database operation is not an update, then processing proceeds from decision step 804 to decision step 806. As shown at decision step 806, if the database operation is a delete, then the partition-level incarnation number maintained by the partition master is increased as shown at step 814. If the node at which the delete occurred is the partition master, then this operation can be handled locally. However, if the node at which the delete occurred is not the partition master, then this operation must be performed by a remote node. As shown at step 816, after the incarnation number is increased in step 814, the deletion and the updated incarnation number are then published to all remote nodes. Each remote node then purges the relevant record and also updates its own partition-level incarnation number to match the updated authoritative version of the partition-level incarnation number from the partition master. After step 816, processing ends as shown at step 812.

If the database operation is not a delete, then processing proceeds from decision step 806 to decision step 808. As shown at decision step 808, if the database operation is an insert, then the partition-level incarnation number is obtained from the partition master as shown at step 818. If the node at which the insert occurred is the partition master, then this operation can be handled locally. However, if the node at which the insert occurred is not the partition master, then this operation must be performed by a remote node. At shown at step 820, if the partition master is a remote node, then the node at which the insert occurred updates its own partition-level incarnation number to match the obtained authoritative version of the partition-level incarnation number from the partition master. At step 822, the node at which the insert occurred sets the record-level incarnation number of the newly-inserted record to match the obtained authoritative version of the partition-level incarnation number from the partition master. At step 824, the node at which the insert occurred sets the sequence number of the newly-inserted record to an initial value, which in one embodiment is the lowest value that can be held by the sequence number.

If at decision step 808 it is determined that the database operation is not an insert, then processing ends as shown at step 812.

Figure 9:
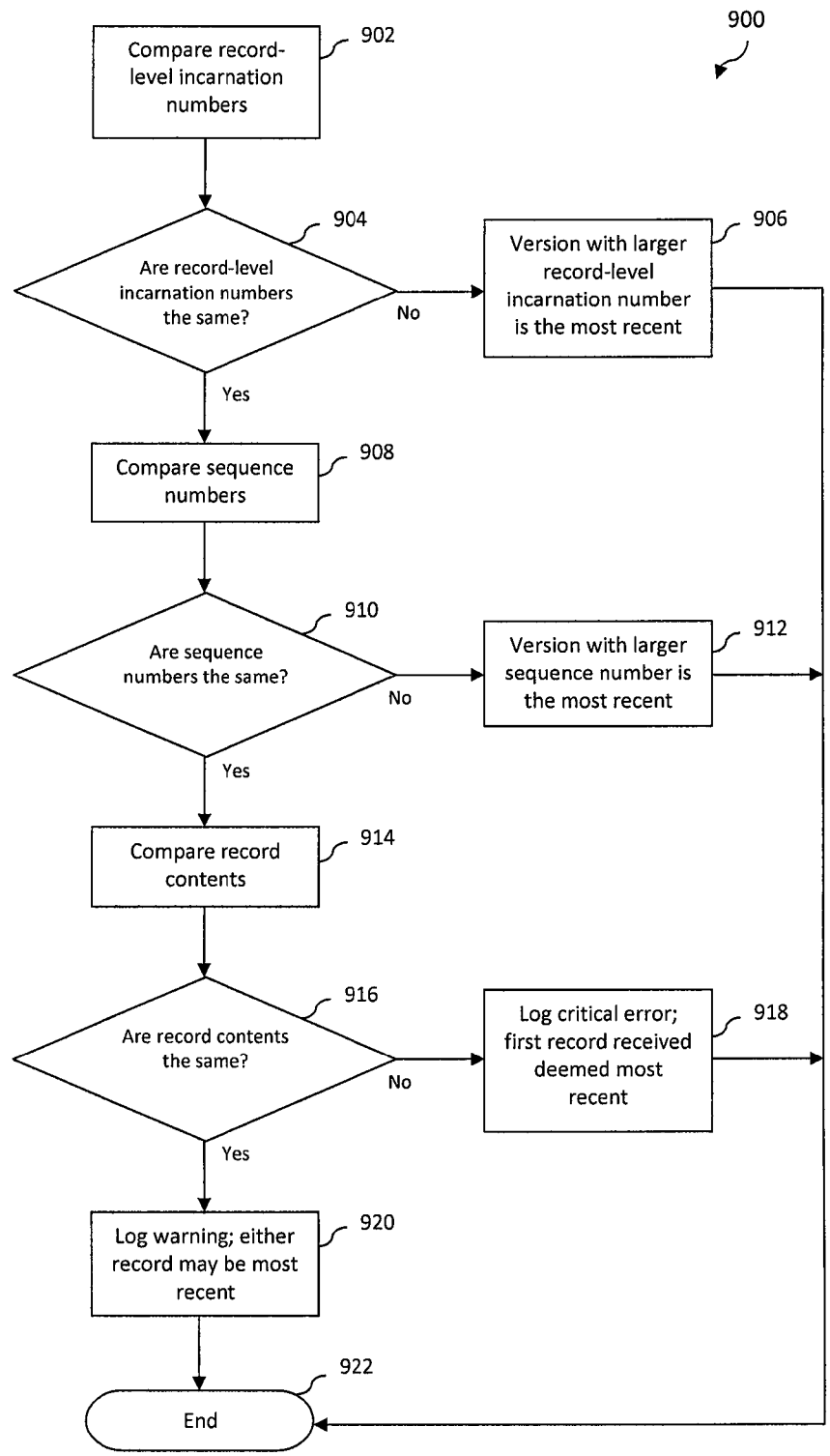
FIG. 9 illustrates a flowchart of a method by which a node in a distributed database system uses record-level incarnation numbers and sequence numbers to determine which of two versions of the same record is most recent in accordance with an embodiment of the present invention.

FIG. 9 illustrates a flowchart 900 of a method by which a node in distributed database system 100 uses record-level incarnation numbers and sequence numbers to determine which of two versions of the same record is most recent. The method of flowchart 900 may be used by a node, for example, when it receives two different versions of the same record from a remote record master following the performance of a series of updates to the record by the record master.

As shown in FIG. 9, the method of flowchart 900 begins at step 902 in which the node compares the two record-level incarnation numbers respectively associated with the two version of the record. At decision step 904, it is then determined whether the record-level incarnation numbers compared in step 902 are the same. If they are not the same, then as shown in step 906 the version of the record with the larger record-level incarnation number is deemed the most recent and processing ends at step 922.

However, if it is determined at decision step 904 that the record-level incarnation numbers compared in step 902 are the same, then processing proceeds to step 908, in which the node compares the two sequence numbers respectively associated with the two versions of the record. At decision step 910, it is then determined whether the sequence numbers compared in step 908 are the same. If they are not the same, then as shown in step 912 the version of the record with the larger sequence number is deemed the most recent and processing ends at step 922.

However, if it is determined at decision step 910 that the sequence numbers compared in step 908 are the same, then processing proceeds to step 914, in which the node compares the contents of each version of the record. At decision step 916, it is then determined whether the contents of each version of the record are the same. If the contents are the same, then the versions are identical and either can be deemed the most recent as shown at step 920. Also, during this step, a warning is automatically logged. If the contents are not the same, then two different versions of the same record have the same version number. In this case, the version of the record received first by the node is deemed the most recent and the version received second is rejected as shown at step 918. Also, during this step, a critical error is automatically logged that invites or requires human attention. After the execution of either step 918 or 920, processing ends at step 922.

As can be seen from the foregoing description, distributed database system 100 maintains and uses incarnation numbers and sequence numbers to sequence different versions of the same record. If the system used only a sequence number to perform this function, then a problem might result when a record was deleted and then a record with the same key was inserted. The deletion of the record would cause the sequence number associated with the record to be lost. As a result, if a record having the same key was inserted, there would be no way to ensure that the sequence number associated with the newly-inserted record was distinct from other versions of the deleted record that might still reside in one or more storage locations in distributed database system 100.

The method of flowchart 800 addresses this issue by assigning a version number to the newly-inserted record that is distinct from any version number associated with a previous version of the record. In particular, by incrementing the incarnation number of a partition on any delete from the partition, and then setting the record-level incarnation number of the newly-inserted record equal to the incremented partition-level incarnation number, the method of flowchart 800 ensures that if a record is deleted and then a record with the same key is inserted, the newly-inserted record will have a distinct version number as compared to the deleted record. This is because the incarnation number portion of the version number will by necessity be distinct.

This approach is superior to that used by conventional distributed database systems that maintain "tombstone" records to address the same problem. As will be appreciated by persons skilled in the relevant art(s), in such conventional systems, after deletion of a record, a stub record is maintained to represent the deleted record, wherein the stub record includes a version number associated with the deleted record. The creation, maintenance and expiration of such tombstone records add a significant amount of complexity and expense to the distributed database system. An embodiment of the present invention avoids the use of such tombstone records by essentially aggregating the same information into a partition-level incarnation number.

However, maintaining the partition-level incarnation number can still require an expensive operation. As shown above in flowchart 800 of FIG. 8, all insert and delete operations performed by a record master require accessing the partition master. If the record master is not also the partition master, then this operation must be performed by a remote node. This remote access is costly in terms of the time and bandwidth. For distributed database systems with large partitions, it is virtually impossible to ensure that the record master and the partition master will always be the same node. Therefore, in such systems, there is a reasonable likelihood that a record deletion or insertion will require the performance of this expensive operation.

C. Decentralized Record Expiry in Accordance with an Embodiment of the Present Invention As used herein the term "record expiry" refers to a system-initiated deletion of a database record. Database records may be set to expire for any number of reasons. For example, the value or relevance of some information decreases over time. Additionally, expiry may be used to remove older data from a system to free up resources to make room for newer data.

In distributed database system 100, expiry is logically a delete, with the only difference being that it is initiated by the system rather than by a client. Thus, when a record expires, the record master must ensure that the incarnation number maintained at the partition master is increased. One straightforward way to implement an expiration in distributed database system 100 is for each node to determine when a record for which it is designated record master has expired and to perform the following steps responsive to determining that the record has expired: (1) stop accepting updates to the record, (2) access the partition master to increment the partition-level incarnation number, and then (3) purge the record.

However, this solution is expensive for at least two reasons. First, it requires a mechanism that triggers an alert to the record master when the record has expired. Second, in any case where the record master is not also the partition master, the solution requires a remote access to the partition master, which as described above, can be expensive. In a large-scale distributed database system with millions or billions of records, the necessary logic for implementing the trigger and the bandwidth cost for remote accesses to the partition master can be prohibitive.

An embodiment of the present invention utilizes a different approach. In accordance with this embodiment, database records are not actively expired. Rather, a record is checked to see if it has expired only when it has been accessed for a read or a write. If at the time of a read a record is determined to have expired, then distributed database system 100 does not serve it, instead acting as if it had been deleted. If at the time of a write a record is determined to have expired, then the write is treated as an insertion of a new record, and steps are taken to treat the insertion consistently with regard to the previous expired version.

Figure 10:
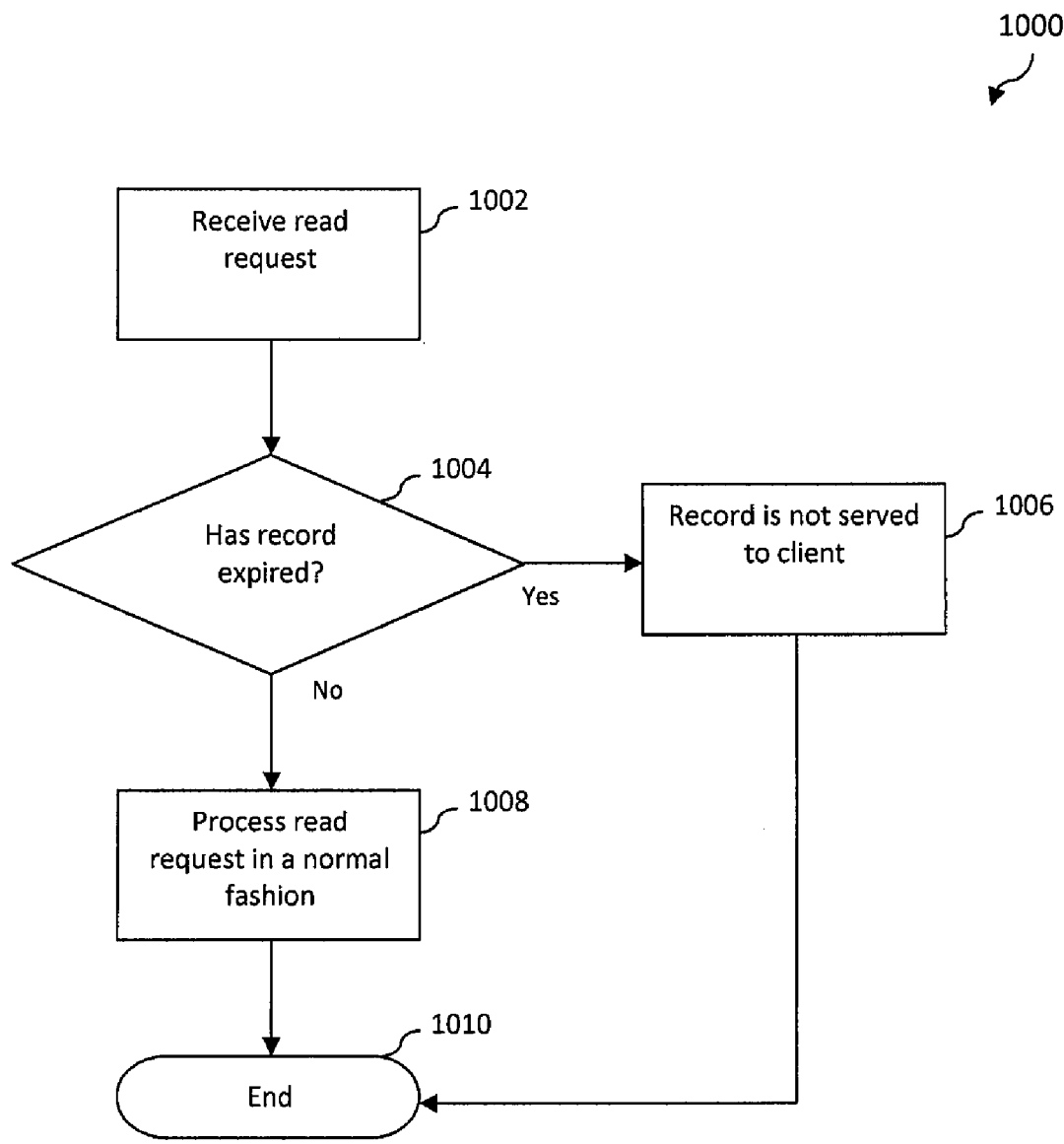
FIG. 10 depicts steps relating to record expiry that are performed by a node within distributed database system when performing a read operation in accordance with an embodiment of the present invention.
Figure 11:
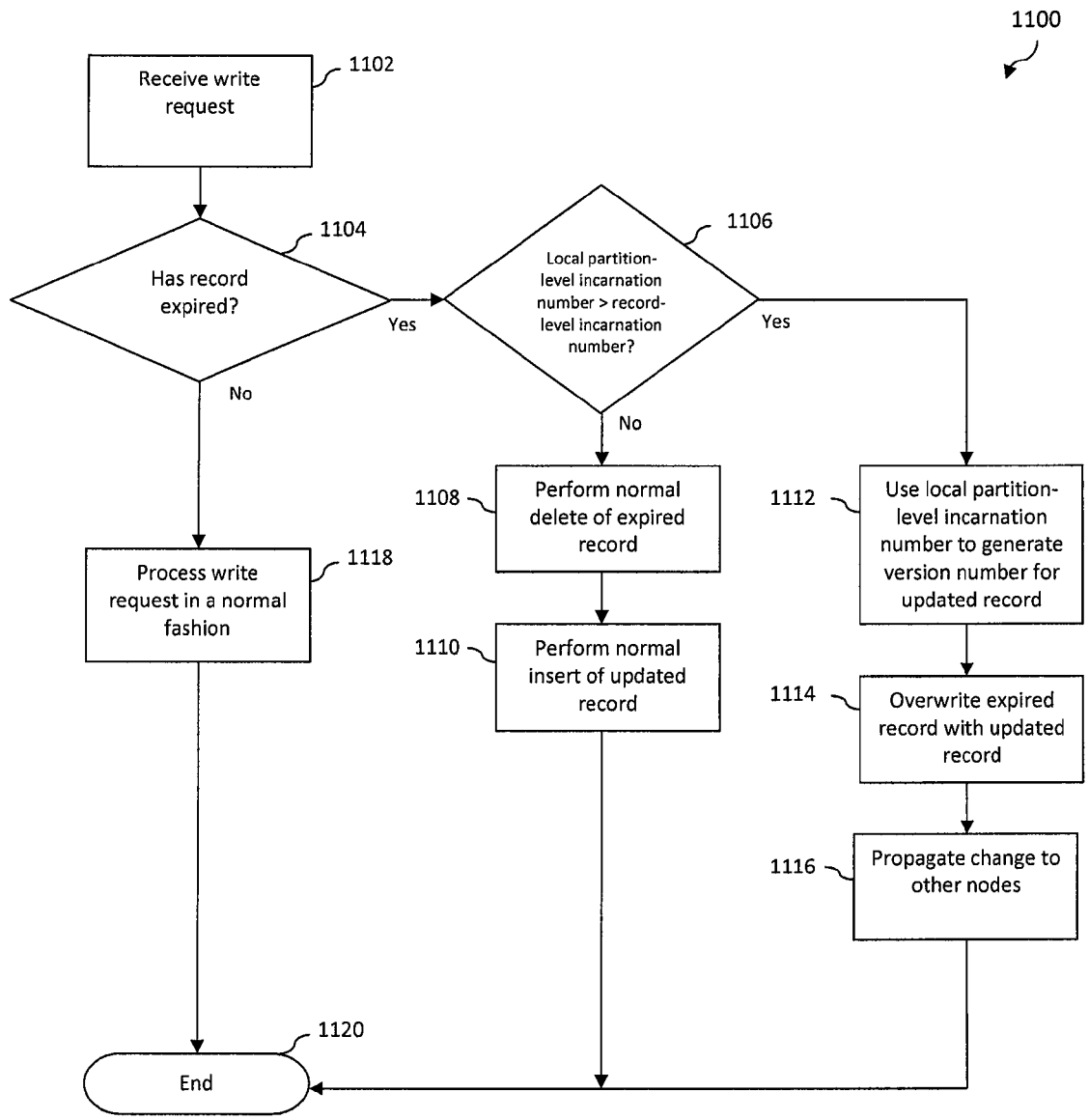
FIG. 11 depicts steps relating to record expiry that are performed by a node within a distributed database system when performing a write (or update) operation in accordance with an embodiment of the present invention.

This approach to expiry will now be more fully described in reference to flowchart 1000 of FIG. 10 and flowchart 1100 of FIG. 11. In particular, flowchart 1000 of FIG. 10 depicts steps that are performed by a node within distributed database system 100 when performing a read operation while flowchart 1100 of FIG. 11 depicts steps that are performed by a node within distributed database system when performing a write (or update) operation.

As shown in FIG. 10, the method of flowchart 1000 begins at step 1002, in which a client request to read a record is received. At decision step 1004, a determination is made as to whether the requested record has expired. Determining whether the record has expired may involve determining whether an expiration period associated with the record has passed or whether a current date and/or time is later than an expiration date and/or time associated with the record. However, these examples are not intended to be limiting and other methods may be used to determine whether the record has expired as will be appreciated by persons skilled in the relevant art(s).

If the record has not expired, then the read request is handled in a normal fashion as shown at step 1006. However, if the record has expired, then the record is not served to the client. Thus, the read request is effectively treating as if the record has been deleted. This is shown at step 1008. After the performance of either step 1006 or step 1008, processing ends as shown at step 1010.

As shown in FIG. 11, the method of flowchart 1100 begins at step 1102, in which a client request to write a record is received by the record master. As noted above, all write requests are handled by the record master. At step 1104, a determination is made as to whether the requested record has expired. As noted above, determining whether the record has expired may involve determining whether an expiration period associated with the record has passed or whether a current date and/or time is later than an expiration date and/or time associated with the record. However, these examples are not intended to be limiting and other methods may be used to determine whether the record has expired as will be appreciated by persons skilled in the relevant art(s).

If the record has not expired, then the write request is handled in a normal fashion as shown at step 1118 and then processing ends as shown at step 1120. However, if the record has expired, then the write is treated as an insertion of a new record, and steps are taken to treat the insertion consistently with regard to the previous expired version. These steps begin with decision step 1106.

At decision step 1106, the record master determines whether the local partition-level incarnation number has advanced beyond the incarnation number in the expired record. If it has not (i.e., if the local partition-level incarnation number is less than or equal to the incarnation number in the expired record), then the record master first initiates a normal delete of the expired record as shown at step 1108. As described above in reference to flowchart 800 of FIG. 8, this deletion requires accessing the partition master to update the authoritative partition-level incarnation number. After step 1108, the record master next initiates a normal insertion of the updated record as shown at step 1110. As also described above in reference to flowchart 800 of FIG. 8, this insertion requires accessing the partition master to obtain the authoritative partition-level incarnation number. The performance of these steps ensures that the inserted record will have a distinct version number from the expired record, as described in detail above. However, if the record master is not also the partition master, than a costly remote access must be performed to carry out each of these steps. After the performance of step 1110, processing ends as shown at step 1120.

If, however, at decision step 1106, the record master determines that the local partition-level incarnation number has advanced beyond the incarnation number in the expired record (i.e., if the local partition-level incarnation number is greater than the incarnation number in the expired record), then the record master locally generates a new version number for the updated version of the record in the manner shown at step 1112. In particular, the new version number is created by combining the local partition-level incarnation number with a sequence number, wherein the sequence number is set to an initial value. In one embodiment the initial value is the lowest value that can be held by the sequence number. This value may be, for example, zero. Then, at step 1114, the record master overwrites the expired version of the record with the updated version of the record. At step 1116, the record master propagates this change to other nodes using a message broker or other notification system or protocol. After step 1116, processing ends as shown at step 1120.

Note that due to the publication of increments to the authoritative version of the partition-level incarnation number by the partition master (as described above in reference to step 816 of FIG. 8), the local partition-level incarnation number should never be less than the incarnation number in the expired record. Thus, the detection of such a condition during step 1106 would indicate a programming error or some other error condition within system 100.

Performing steps 1112, 1114 and 1116 as described above avoids the remote accesses to the partition master that need to be performed during steps 1108 and 1110 in cases where the record master is not the partition master. These remote accesses can be avoided because the test implemented by decision step 1106 ensures that the version number generated locally for the updated record in step 1112 will be distinct from the version number associated with the expired record. Note than in some cases the local partition-level incarnation number may be less than the authoritative partition-level incarnation number maintained by the partition master. However, this is not a problem so long as the local partition-level incarnation number exceeds the record-level incarnation number in the version number of the expired record.

In a distributed database in which each partition includes a very large number of records, it is highly likely that the local partition-level incarnation number will exceed the record-level incarnation number in the version number of the expired record. This is because it is highly likely that at least one other record in the partition will have been recently deleted or expired, thereby causing the local partition-level incarnation number to increase beyond the record-level incarnation number. Thus, it is anticipated that in a distributed database system with large partitions, expiration upon writes can be handled using steps 1112, 1114 and 1116 (which avoid remote accesses) rather than steps 1108 and 1110 (which may require remote accesses) in the vast majority of cases.

In distributed database system 100, some records may expire but never be written to or actively deleted by a client after expiration. Consequently, in an embodiment of the present invention, each node implements a "garbage collection" process that augments the previously-described processes. Each node runs the garbage collection process periodically and in the background to reclaim storage space. For efficiency, the process may be run only when utilization of node resources for servicing client requests is low.

As will be described in more detail below, the garbage collection process iterates over all locally-stored records. If a record is expired and the node is the record master, expiry is initiated in a like manner to that described in steps 1114 and 1116 of FIG. 11, except that purging replaces the overwriting in step 1114. The partition master only needs to be contacted if the local partition-level incarnation number has not advanced beyond that in the expired record's version number.

Figure 12:
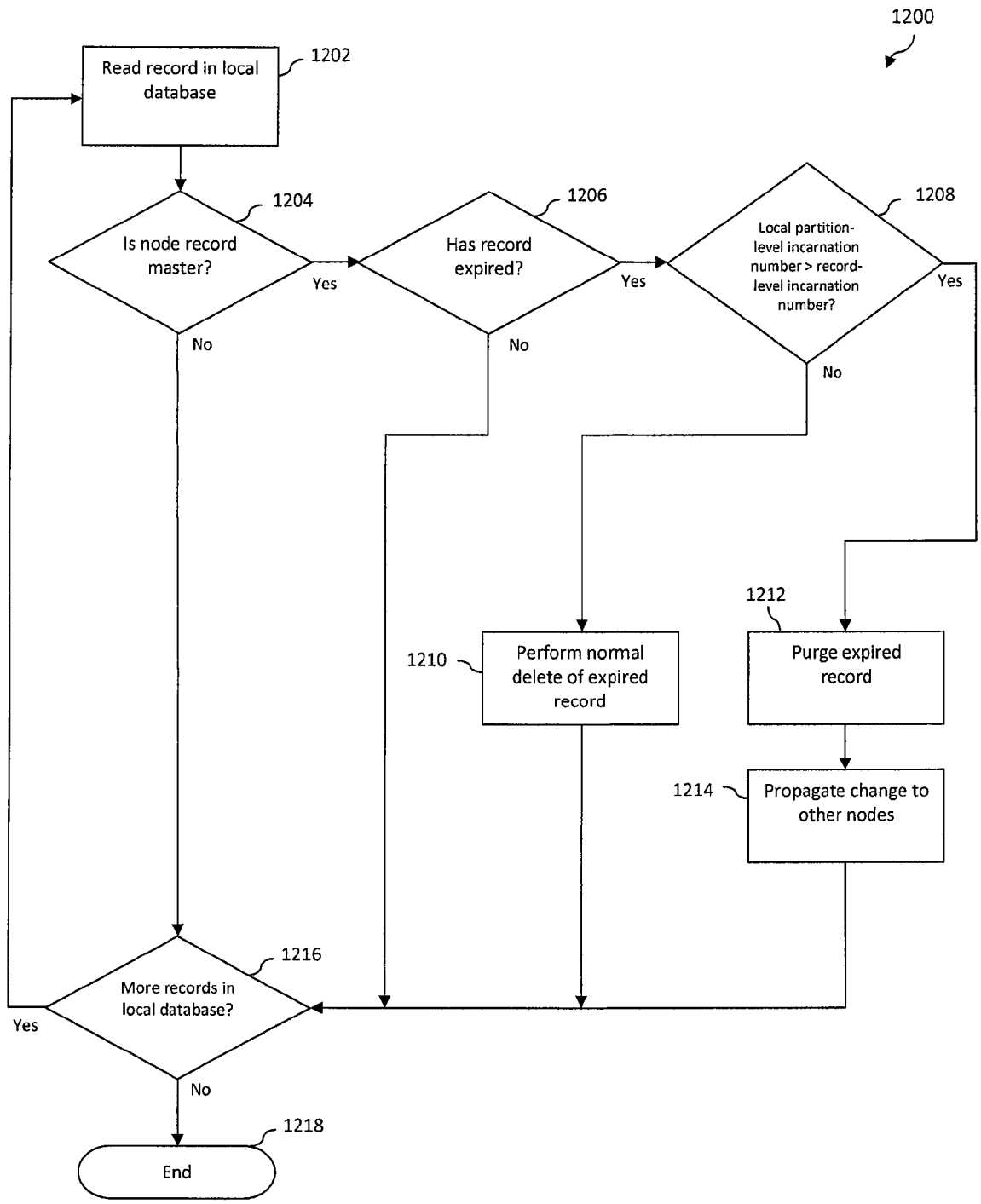
FIG. 12 illustrates a flowchart of a garbage collection process implemented by nodes within a distributed database system in accordance with an embodiment of the present invention.

FIG. 12 provides a flowchart 1200 of such a process. As shown in FIG. 12, the method of flowchart 1200 begins at step 1202, in which the node reads a record from its local database. At decision step 1204, the node determines if it is the record master for that record. If the node is not the record master, then control flows to decision step 1216. At decision step 1216, the node determines if there are any more records in the local database. If there are more records in the local database, then control returns to step 1202 and the next record is read from the local database. If there are no more records in the local database, then the process ends as shown at step 1218.

If, at decision step 1204, the node determines that it is the record master for the record that was read in step 1202, then control flows to decision step 1206. At decision step 1206, the node determines whether the record that was read in step 1202 has expired. As noted above, determining whether the record has expired may involve determining whether an expiration period associated with the record has passed or whether a current date and/or time is later than an expiration date and/or time associated with the record. However, these examples are not intended to be limiting and other methods may be used to determine whether the record has expired as will be appreciated by persons skilled in the relevant art(s).

If the record has not expired, then control flows to decision step 1216, in which the node determines if there are any more records in the local database. If there are more records in the local database, then control returns to step 1202 and the next record is read from the local database. If there are no more records in the local database, then the process ends as shown at step 1218.

If it is determined at decision step 1206 that the record that was read in step 1202 has expired, then control flows to decision step 1208. At decision step 1208, the node determines whether the local partition-level incarnation number has advanced beyond the incarnation number in the expired record. If it has not (i.e., if the local partition-level incarnation number is less than or equal to the incarnation number in the expired record), then the node initiates a normal delete of the expired record as shown at step 1210. As described above in reference to flowchart 800 of FIG. 8, this deletion requires accessing the partition master to update the authoritative partition-level incarnation number. However, if the node performing the garbage collection process is not also the partition master, than a costly remote access must be performed to carry out this step. After the performance of step 1210, control flows to decision step 1216, in which the node determines if there are any more records in the local database. If there are more records in the local database, then control returns to step 1202 and the next record is read from the local database. If there are no more records in the local database, then the process ends as shown at step 1218.

If it is determined at decision step 1208 that the local partition-level incarnation number has advanced beyond the incarnation number in the expired record (i.e., if the local partition-level incarnation number is greater than the incarnation number in the expired record), then the node purges the expired record as shown at step 1212. No contact with the partition master need be made. At step 1214, the node propagates this change to other nodes using a message broker or other notification system or protocol. After step 1214, control flows to decision step 1216, in which the node determines if there are any more records in the local database. If there are more records in the local database, then control returns to step 1202 and the next record is read from the local database. If there are no more records in the local database, then the process ends as shown at step 1218.

Performing steps 1212 and 1214 as described above avoids the remote access to the partition master that needs to be performed during step 1210 in cases where the record master is not the partition master. The remote access can be avoided because the test implemented by decision step 1208 ensures that any record inserted after the purging of the expired record that has the same key as the expired record will be assigned a version number that is distinct from the version number associated with the expired record.

As noted above, in a distributed database in which each partition includes a very large number of records, it is highly likely that the local partition-level incarnation number will exceed the record-level incarnation number in the version number of the expired record. This is because it is highly likely that at least one other record in the partition will have been recently deleted or expired, thereby causing the local partition-level incarnation number to increase beyond the record-level incarnation number. Thus, it is anticipated that in a distributed database system with large partitions, expiry based on a garbage collection process can be handled using steps 1212 and 1214 (which avoid remote accesses) rather than step 1210 (which may require a remote access) in the vast majority of cases.

It should be noted that in an alternate embodiment, the garbage collection process can use a normal delete (as described above in reference to step 1210) to delete expired records in every case. Although this is less optimal than the method described above in reference to flowchart 1200 in terms of conserving time and system bandwidth, it is a simpler approach and may be deemed acceptable in some cases. For example, since the garbage collection process is run in the background instead of as a part of a client-initiated process, it may be that a certain amount of latency is tolerable. Also, since the garbage collection process may be run during periods of time when system resource utilization is low, it may also be that a certain amount of extra resource consumption is tolerable.

D. Example Computer System Implementation

Many of the elements of distributed database system 100 as well as many of the steps of flowcharts 800, 900, 1000, 1100 and 1200 may be implemented using any well-known processor-based computer system. An example of such a computer system 1300 is depicted in FIG. 13.

Figure 13:
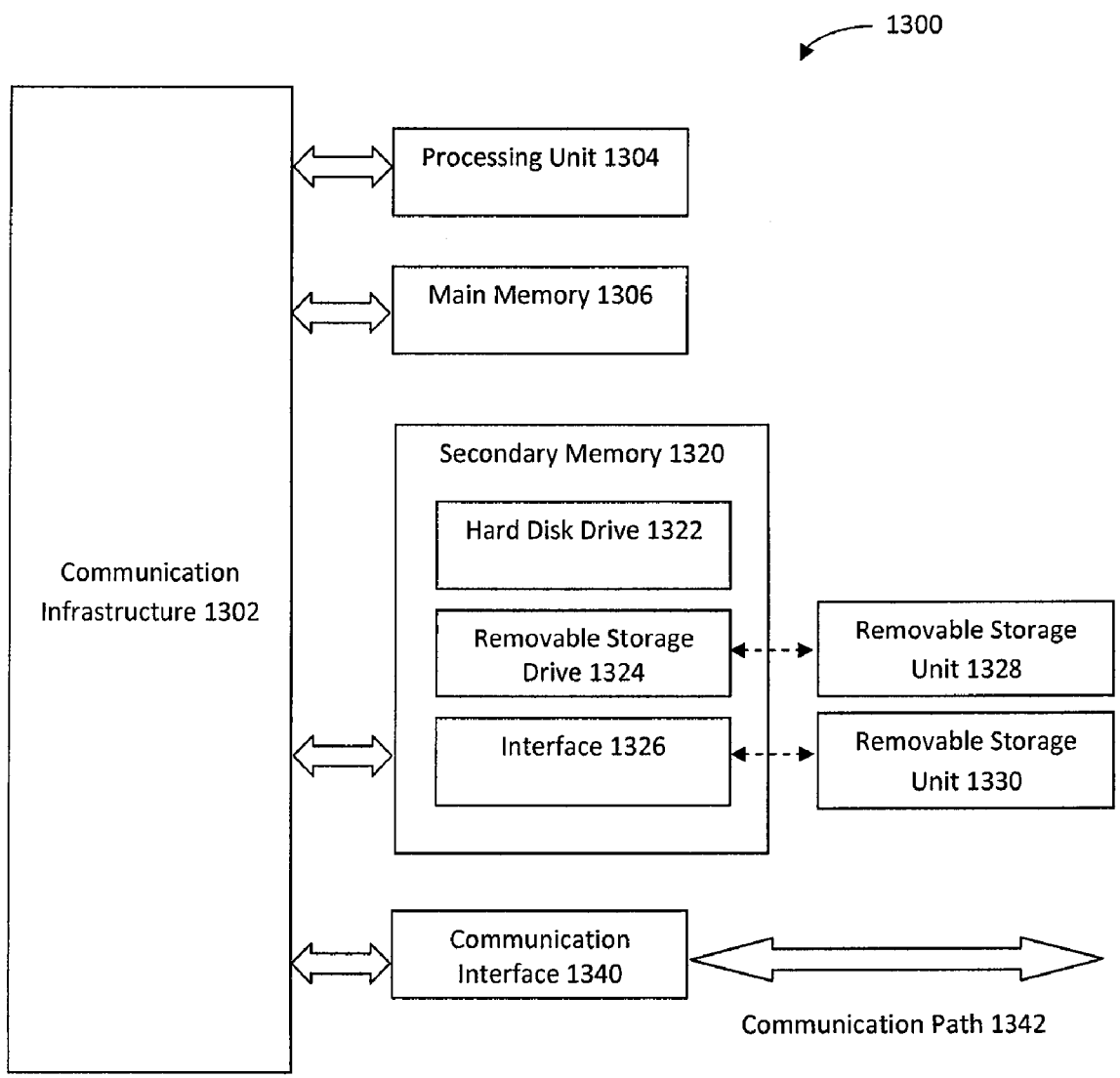
FIG. 13 illustrates an example processor-based computer system that may be used to implement the present invention.

As shown in FIG. 13, computer system 1300 includes a processing unit 1304 that includes one or more processors. Processor unit 1304 is connected to a communication infrastructure 1302, which may comprise, for example, a bus or a network.

Computer system 1300 also includes a main memory 1306, preferably random access memory (RAM), and may also include a secondary memory 1320. Secondary memory 1320 may include, for example, a hard disk drive 1322, a removable storage drive 1324, and/or a memory stick. Removable storage drive 1324 may comprise a floppy disk drive, a magnetic tape drive, an optical disk drive, a flash memory, or the like. Removable storage drive 1324 reads from and/or writes to a removable storage unit 1328 in a well-known manner. Removable storage unit 1328 may comprise a floppy disk, magnetic tape, optical disk, or the like, which is read by and written to by removable storage drive 1324. As will be appreciated by persons skilled in the relevant art(s), removable storage unit 1328 includes a computer usable storage medium having stored therein computer software and/or data.

In alternative implementations, secondary memory 1320 may include other similar means for allowing computer programs or other instructions to be loaded into computer system 1300. Such means may include, for example, a removable storage unit 1330 and an interface 1326. Examples of such means may include a program cartridge and cartridge interface (such as that found in video game devices), a removable memory chip (such as an EPROM, or PROM) and associated socket, and other removable storage units 1330 and interfaces 1326 which allow software and data to be transferred from the removable storage unit 1330 to computer system 1300.

Computer system 1300 may also include a communications interface 1340. Communications interface 1340 allows software and data to be transferred between computer system 1300 and external devices. Examples of communications interface 1340 may include a modem, a network interface (such as an Ethernet card), a communications port, a PCM-CIA slot and card, or the like. Software and data transferred via communications interface 1340 are in the form of signals which may be electronic, electromagnetic, optical, or other signals capable of being received by communications interface 1340. These signals are provided to communications interface 1340 via a communications path 1342. Communications path 1342 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 1328, removable storage unit 1330, a hard disk installed in hard disk drive 1322, and signals received by communications interface 1340. Computer program medium and computer useable medium can also refer to memories, such as main memory 1306 and secondary memory 1320, which can be semiconductor devices (e.g., DRAMs, etc.). These computer program products are means for providing software to computer system 1300.

Computer programs (also called computer control logic, programming logic, or logic) are stored in main memory 1306 and/or secondary memory 1320. Computer programs may also be received via communications interface 1340. Such computer programs, when executed, enable the computer system 1300 to implement features of the present invention as discussed herein. Accordingly, such computer programs represent controllers of the computer system 1300. Where the invention is implemented using software, the software may be stored in a computer program product and loaded into computer system 1300 using removable storage drive 1324, interface 1326, or communications interface 1340.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for automatically deleting an expired record in a distributed database system comprising a plurality of nodes, wherein each node comprises one or more processor-based systems and is configured to manage a respective one of a plurality of databases, the method comprising:
    receiving a write request for a record at the one of the plurality of nodes, wherein the record is one of a plurality of records within a partition stored in the database managed by the one of the plurality of nodes and wherein the partition comprises a distinct portion of a logical database;
    determining whether the record is expired responsive to receiving the write request;
    determining if an incarnation number associated with the partition exceeds an incarnation number stored in the record responsive to determining that the record is expired;
    responsive to determining that the incarnation number associated with the partition exceeds the incarnation number stored in the record,
        generating an updated record based on the write request, wherein generating the updated record comprises replacing the incarnation number stored in the record with the incarnation number associated with the partition and
        overwriting the expired record with the updated record; and
    responsive to determining that the incarnation number associated with the partition does not exceed the incarnation number stored in the record,
        deleting the expired record, wherein deleting the expired record comprises sending a message to a remote node to increment an incarnation number associated with a partition stored in the database managed by the remote node,
        generating an updated record based on the write request, and
        inserting the updated record.

2. The method of claim 1, wherein generating an updated record based on the write request further comprises setting a sequence number stored in the updated record to an initial value.

3. The method of claim 1, further comprising:
    sending a message to the other nodes regarding the overwriting of the expired record with the updated record.

4. The method of claim 3, wherein generating the updated record comprises:
    obtaining an incarnation number from a remote node, wherein the incarnation number obtained from the remote node is associated with a partition stored in the database managed by the remote node, and
    replacing the incarnation number stored in the record with the incarnation number obtained from the remote node.

5. A distributed database system, comprising:
    a plurality of nodes, wherein the plurality of nodes are interconnected via a communication system and wherein each node comprises one or more processors and memory; and
    a plurality of databases, wherein each node in the plurality of nodes is configured to manage a respective one of a plurality of databases;
    wherein each node in the plurality of nodes is further configured to receive a write request for a record, wherein the record is one of a plurality of records within a partition stored in the database managed by the node and wherein the partition comprises a distinct portion of a logical database, to determine whether the record is expired responsive to receiving the write request, to determine if an incarnation number associated with the partition exceeds an incarnation number stored in the record responsive to determining that the record is expired, and, responsive to determining that the incarnation number associated with the partition exceeds the incarnation number stored in the record, to generate an updated record based on the write request, wherein generating the updated record comprises replacing the incarnation number stored in the record with the incarnation number associated with the partition, and to overwrite the expired record with the updated record, and
    wherein each node in the plurality of nodes is further configured to, responsive to determining that the incarnation number associated with the partition does not exceed the incarnation number stored in the record, delete the expired record, wherein deleting the expired record comprises sending a message to a remote node to increment an incarnation number associated with a partition stored in the database managed by the remote node, to generate an updated record based on the write request, and to insert the updated record.

6. The system of claim 5, wherein each node in the plurality of nodes is configured to generate an updated record based on the write request by setting a sequence number stored in the updated record to an initial value.

7. The system of claim 5, wherein each node in the plurality of nodes is further configured to send a message to the other nodes via the communication system regarding the overwriting of the expired record with the updated record.

8. The system of claim 5, wherein each node in the plurality of nodes is configured to generate the updated record by obtaining an incarnation number from a remote node, wherein the incarnation number obtained from the remote node is associated with a partition stored in the database managed by the remote node, and replacing the incarnation number stored in the record with the incarnation number obtained from the remote node.

9. A method for automatically deleting an expired record in a distributed database system comprising a plurality of nodes, wherein each node comprises one or more processor-based systems and is configured to manage a respective one of a plurality of databases, the method being performed by one of the plurality of nodes and the method comprising:
    reading a record at the one of the plurality of nodes, wherein the record is one of a plurality of records within a partition stored in the database managed by the one of the plurality of nodes and wherein the partition comprises a distinct portion of a logical database;
    determining whether the record is expired;
    determining if an incarnation number associated with the partition exceeds an incarnation number stored in the record responsive to determining that the record is expired;
    purging the record responsive to determining that the incarnation number associated with the partition exceeds the incarnation number stored in the record; and
    deleting the expired record responsive to determining that the incarnation number associated with the partition does not exceed the incarnation number stored in the record, wherein deleting the expired record comprises sending a message to a remote node to increment an incarnation number associated with a partition stored in the database managed by the remote node.

10. The method of claim 9, further comprising:
sending a message to the other nodes regarding the purging of the record.

11. A distributed database system, comprising:
a plurality of nodes, wherein the plurality of nodes are interconnected via a communication system and wherein each node comprises one or more processors and memory; and
a plurality of databases, wherein each node in the plurality of nodes is configured to manage a respective one of a plurality of databases;
wherein each node in the plurality of nodes is further configured to read a record, wherein the record is one of a plurality of records within a partition stored in the database managed by the node and wherein the partition comprises a distinct portion of a logical database, to determine whether the record is expired, to determine if an incarnation number associated with the partition exceeds an incarnation number stored in the record responsive to determining that the record is expired, and to purge the record responsive to determining that the incarnation number associated with the partition exceeds the incarnation number stored in the record, and wherein each node in the plurality of nodes is further configured to, responsive to determining that the incarnation number associated with the partition does not exceed the incarnation number stored in the record, delete the expired record, wherein deleting the expired record comprises sending a message to a remote node to increment an incarnation number associated with a partition stored in the database managed by the remote node.

12. The system of claim 11, wherein each node in the plurality of nodes is further configured to send a message to the other nodes regarding the purging of the record.

* * * * *